(12) United States Patent
Oohashi et al.

(10) Patent No.: US 6,225,727 B1
(45) Date of Patent: May 1, 2001

(54) ROTOR FOR DYNAMO-ELECTRIC MACHINE AND METHOD FOR MAGNETIZING MAGNETIC BODIES THEREOF

(75) Inventors: Atsushi Oohashi; Yoshihito Asao, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/420,006

(22) Filed: Oct. 18, 1999

(30) Foreign Application Priority Data

May 24, 1999 (JP) .................................................. 11-143589

(51) Int. Cl.[7] ...................................................... H02K 1/22
(52) U.S. Cl. ........................................... 310/263; 310/261
(58) Field of Search ............................ 310/263, 269, 310/261, 156; 29/596–597

(56) References Cited

U.S. PATENT DOCUMENTS

| | | | |
|---|---|---|---|
| 5,221,503 | * 6/1993 | Ward et al. | 264/104 |
| 5,539,265 | * 7/1996 | Harris et al. | 310/263 |
| 5,783,895 | * 7/1998 | Hakala et al. | 310/268 |
| 5,903,084 | * 5/1999 | Asao et al. | 310/263 |
| 5,925,964 | * 7/1999 | Kusase et al. | 310/263 |
| 6,013,967 | * 1/2000 | Ragaly et al. | 310/263 |
| 6,013,968 | * 1/2000 | Lechner et al. | 310/263 |

FOREIGN PATENT DOCUMENTS 7-298585    11/1995   (JP) .............................. H02K/19/24

* cited by examiner

Primary Examiner—Tran Nguyen
(74) Attorney, Agent, or Firm—Sughrue, Mion, Zinn Macpeak & Seas, PLLC

(57) ABSTRACT

A rotor for a dynamo-electric machine includes a rotor coil, a first pole core body disposed so as to cover the rotor coil formed with a plurality of first claw-shaped magnetic poles evenly spaced around a circumferential portion thereof being magnetized by magnetic flux, a second pole core body disposed facing the first pole core body having second claw-shaped magnetic poles spaced so as to intermesh between the first claw-shaped magnetic poles, a first magnetic body secured to the first pole core body which is magnetized in directions which reduce magnetic flux leakage with the second claw-shaped magnetic poles at each side surface of the first claw-shaped magnetic poles, and a second magnetic body secured to the second pole core body facing the first magnetic body across an air gap which is magnetized in directions which reduce magnetic flux leakage with the first claw-shaped magnetic poles at each side surface of the second claw-shaped magnetic poles.

6 Claims, 11 Drawing Sheets

ROTOR FOR DYNAMO-ELECTRIC MACHINE AND METHOD FOR MAGNETIZING MAGNETIC BODIES THEREOF

BACKGROUND OF THE INVENTION

1. Field of the Invention

The present invention relates to a rotor for a dynamo-electric machine including magnetic bodies disposed between adjacent claw-shaped magnetic poles for minimizing magnetic flux leakage between the claw-shaped magnetic poles, and to a method for magnetizing the magnetic bodies.

2. Description of the Related Art

FIG. 9 is a cross-section of a conventional automotive alternator, FIG. 10 is a perspective of the rotor in FIG. 9, and FIG. 11 is an exploded view of the rotor in FIG. 10. This automotive alternator includes: a case 3 comprising an aluminum front bracket 1 and an aluminum rear bracket 2; a shaft 6 disposed in the case 3 to one end of which a pulley 4 is secured; a Lundell-type rotor 7 secured to the shaft 6; fans 5 secured to both ends of the rotor 7; a stator 8 secured to the inner wall of the case 3; slip rings 9 secured to the other end of the shaft 6 for supplying electric current to the rotor 7; a pair of brushes 10 moving in contact with the slip rings 9; a brush holder 11 accommodating the brushes 10; a rectifier 12 in electrical contact with the stator 8 for converting an alternating current generated in the stator 8 to a direct current; a heat sink 17 fitted over the brush holder 11; and a regulator 18 attached to the heat sink with adhesive for adjusting the magnitude of the alternating current generated in the stator 8.

The rotor 7 includes: a rotor coil 13 having wire 31 wound onto a bobbin 30 for generating magnetic flux by passing an electric current through the wire 31; and a pole core 14 disposed so as to cover the rotor coil 13 in which magnetic poles are produced by the magnetic flux generated by the rotor coil 13. The pole core 14 includes a first pole core body 21 and a second pole core body 22 which mutually intermesh. The first pole core body 21 is formed with a plurality of first claw-shaped magnetic poles 23 evenly spaced around a circumferential portion thereof. Like the first pole core body 21, the second pole core body 22 is made of iron and is formed with a plurality of second claw-shaped magnetic poles 24 evenly spaced around a circumferential portion thereof. A magnetic body 33 magnetized in directions which reduce magnetic flux leakage between the claw-shaped magnetic poles 23, 24 is inserted between the mutually intermeshing first claw-shaped magnetic poles 23 and second claw-shaped magnetic poles 24. The magnetic body 33 is shaped so as to wind in a zigzag circumferentially, and is composed of plastic magnets.

The stator 8 includes: a stator core 15; and a stator coil 16 composed of wire wound into the stator core 15 in which an alternating current is generated by changes in the magnetic flux arising in the rotor coil 13 as the rotor 7 rotates.

In an automotive alternator of the above construction, a current is supplied from a battery (not shown) via the brushes 10 and the slip rings 9 to the rotor coil 13, generating magnetic flux, and the first claw-shaped magnetic poles 23 in the first pole core body 21 are magnetized with a north-seeking (N.) pole, and the second claw-shaped magnetic poles 24 in the second pole core body 22 are magnetized with a south-seeking (S.) pole. At the same time, because the pulley 4 is driven by the engine and the rotor 7 is rotated by the shaft 6, a rotating magnetic field is imparted to the stator coil 16 and electromotive force arises in the stator coil 16. This alternating-current electromotive force is converted to a direct current by means of the rectifier 12, its magnitude is regulated by the regulator 18, and the battery is recharged.

In a conventional rotor 7 for an automotive alternator, because centrifugal force acts on the first and second claw-shaped magnetic poles 23, 24 as the rotor 7 rotates making the first and second claw-shaped magnetic poles 23, 24 vibrate in the direction of arrow A in FIG. 12, one problem has been that there is a risk that the magnetic body 33 will be damaged in places where the tips of the claw-shaped magnetic poles collide therewith, and damage actually occurs when the rotational frequency of the rotor 7 is approximately 10000 to 15000 rpm, for example.

In order to prevent such damage to the magnetic body 33, the magnetic body can be secured to the first pole core body 21 and the second pole core body 22 with adhesive, but even then, one problem has been that the magnetic body 33 is simultaneously subjected to loads of different magnitude and direction from each of the claw-shaped magnetic poles 23, 24 during rotation of the rotor 7 and there is still a risk that the magnetic body 33 will be damaged.

SUMMARY OF THE INVENTION

The present invention aims to solve the above problems and an object of the present invention is to provide a rotor for a dynamo-electric machine in which damage to the magnetic body is less likely even during high-speed rotation, improving tolerance to high speed.

Furthermore, another object of the present invention is to provide a method for magnetizing the magnetic body so that the magnetic body is magnetized to a high residual flux density.

To this end, according to the present invention, there is provided a rotor for a dynamo-electric machine comprising: a rotor coil comprising wire wound onto a bobbin for generating magnetic flux by passing an electric current through the wire; a first pole core body disposed so as to cover the rotor coil formed with a plurality of first claw-shaped magnetic poles evenly spaced around a circumferential portion thereof being magnetized by the magnetic flux; a second pole core body disposed facing the first pole core body having second claw-shaped magnetic poles spaced so as to intermesh between the first claw-shaped magnetic poles; a first magnetic body secured to the first pole core body being magnetized in directions reducing magnetic flux leakage with the second claw-shaped magnetic poles at each side surface of the first claw-shaped magnetic poles; and a second magnetic body secured to the second pole core body facing the first magnetic body across an air gap being magnetized in directions reducing magnetic flux leakage with the first claw-shaped magnetic poles at each side surface of the second claw-shaped magnetic poles.

According to another aspect of the present invention, there is provided a method for magnetizing magnetic bodies of a rotor for a dynamo-electric machine wherein a magnetically permeable member is inserted into the air gap between the first magnetic body and the second magnetic body when the first magnetic body and the second magnetic body are magnetized by passing a current through a magnetizing yoke.

DETAILED DESCRIPTION OF THE PREFERRED EMBODIMENTS

Figure 9:
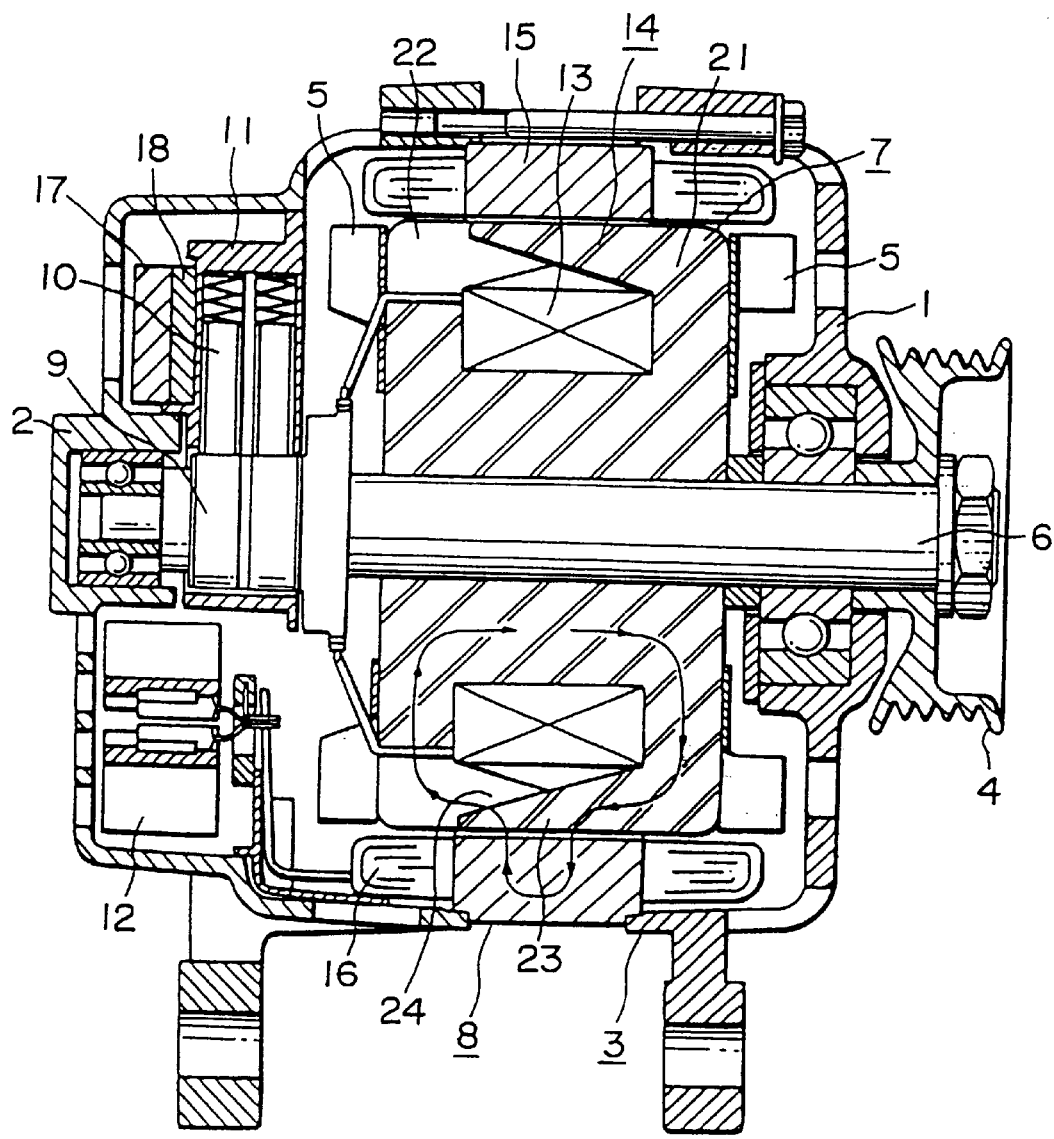
FIG. 9 is a cross-section of a conventional automotive alternator.
Figure 10:
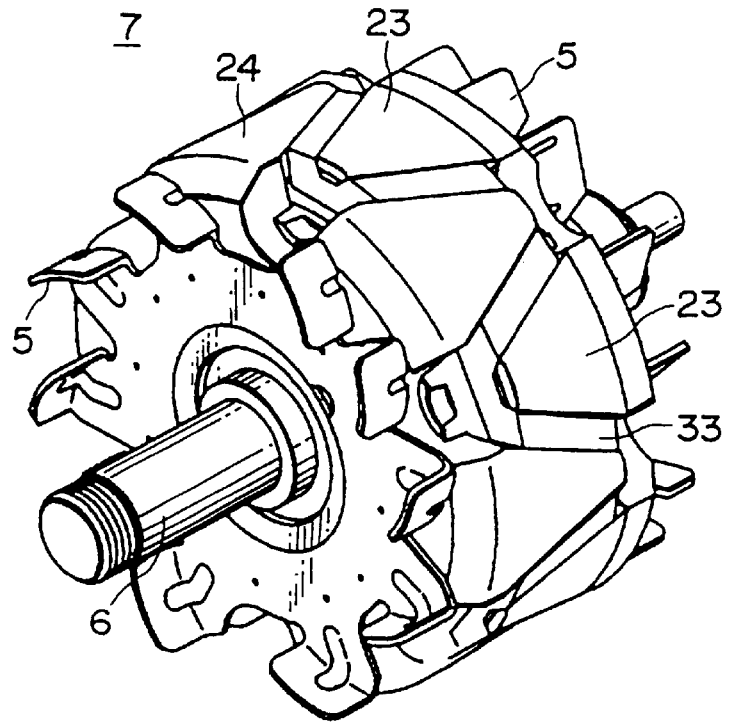
FIG. 10 is a perspective of the rotor in FIG. 9.
Figure 11:
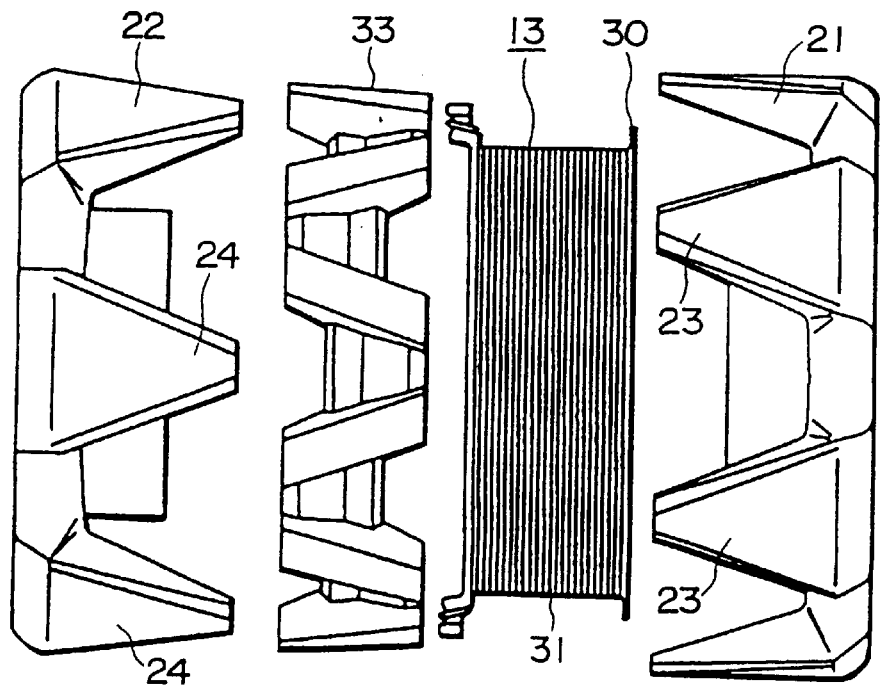
FIG. 11 is an exploded front elevation of the rotor in FIG. 10.

The rotor for an automotive alternator according to the present invention will now be explained, and parts and portions the same as or corresponding to those in FIGS. 9 to 11 will be given the same numbering.

Embodiment 1

Figure 1:
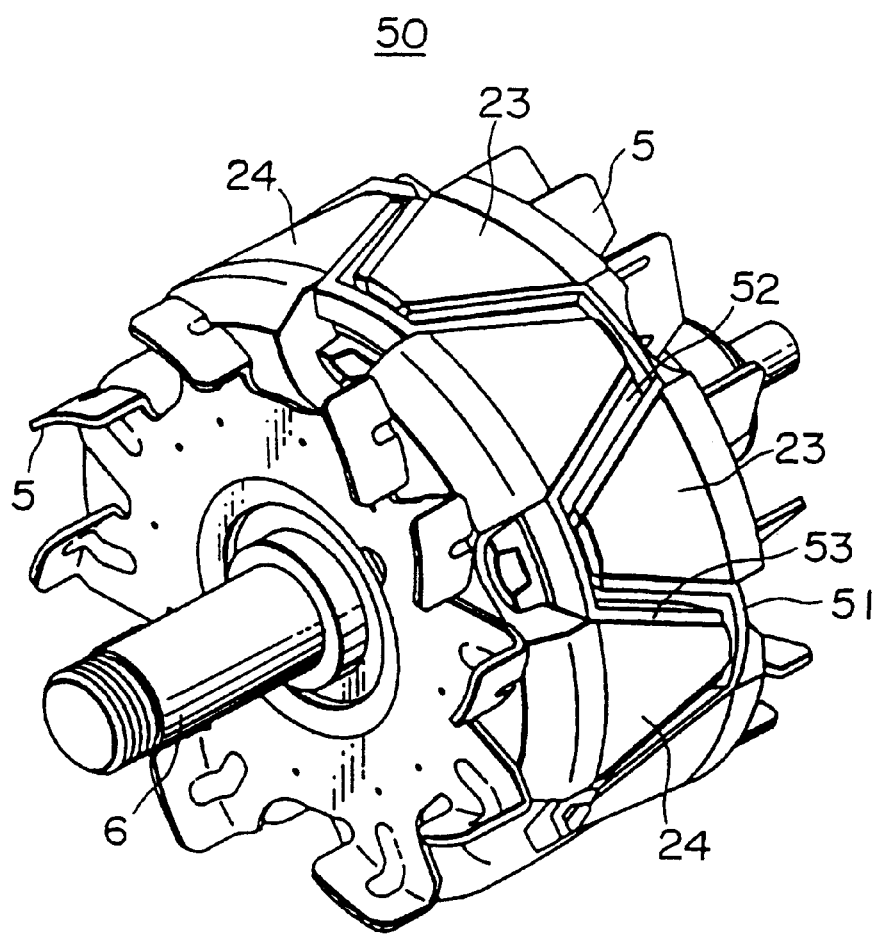
FIG. 1 is a perspective of a rotor of an automotive alternator according to Embodiment 1 of the present invention.
Figure 2:
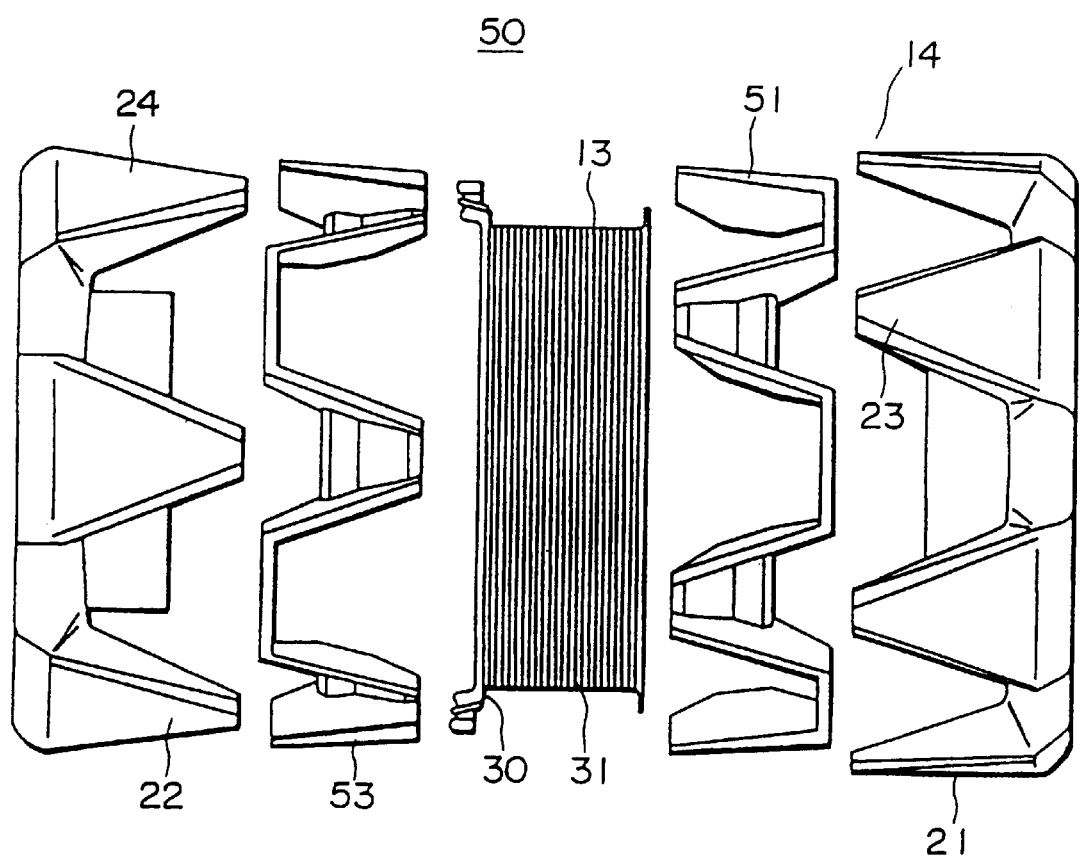
FIG. 2 is an exploded front elevation of the rotor in FIG. 1.

FIG. 1 is a perspective of a rotor of an automotive alternator according to Embodiment 1 of the present invention, and FIG. 2 is an exploded front elevation of the rotor in FIG. 1.

A rotor 50 includes: a rotor coil 13 having wire 31 wound onto a bobbin 30 for generating magnetic flux by passing an electric current through the wire 31; and a pole core 14 disposed so as to cover the rotor coil 13 in which magnetic poles are produced by the magnetic flux generated by the rotor coil 13. The pole core 14 includes a first pole core body 21 and a second pole core body 22 which mutually intermesh. The first pole core body 21 is formed with a plurality of first claw-shaped magnetic poles 23 evenly spaced around a circumferential portion thereof. Like the first pole core body 21, the second pole core body 22 is made of iron and is formed with a plurality of second claw-shaped magnetic poles 24 evenly spaced around a circumferential portion thereof.

In the first pole core body 21, a first magnetic body 51 magnetized in directions which reduce magnetic flux leakage with the second claw-shaped magnetic poles 24 is secured with adhesive to the sides of each of the first claw-shaped magnetic poles 23. In the second pole core body 22, a second magnetic body 53 magnetized in directions which reduce magnetic flux leakage with the first claw-shaped magnetic poles 23 is secured with adhesive to the sides of each of the second claw-shaped magnetic poles 24, facing the first magnetic body 51 across an air gap 52.

The first magnetic body 51 and the second magnetic body 53 are shaped so as to wind in a zigzag circumferentially, and are composed of plastic magnets.

The first magnetic body 51 and the second magnetic body 53, which are composed of magnetic powder mixed into plastic, are magnetized according to the following procedure.

First, an iron member (not shown) being a magnetically permeable member is inserted into the air gap between the first magnetic body 51 and the second magnetic body 53. Next, the first magnetic body 51 and the second magnetic body 53 are magnetized by placing the rotor 50 in this state inside a cylindrical magnetizing yoke (not shown) and instantaneously passing a current of, say, 3000 A at 3000 V through the yoke.

In this embodiment, because the iron member is inserted in the air gap 52 between the first magnetic body 51 and the second magnetic body 53 during magnetization when the first magnetic body 51 and the second magnetic body 53 are being magnetized by forming an intense magnetic field inside the yoke, the first magnetic body 51 and the second magnetic body 53 are magnetized to a high flux density.

In an automotive alternator of the above construction, a current is supplied from a battery (not shown) via the brushes 10 and the slip rings 9 to the rotor coil 13, generating magnetic flux, and the first claw-shaped magnetic poles 23 in the first pole core body 21 are magnetized with a north-seeking (N.) pole, and the second claw-shaped magnetic poles 24 in the second pole core body 22 are magnetized with a south-seeking (S.) pole. At the same time, because the pulley 4 is driven by the engine and the rotor 7 is rotated by the shaft 6, a rotating magnetic field is imparted to the stator coil 16 and electromotive force arises in the stator coil 16. This alternating-current electromotive force is converted to a direct current by means of the rectifier 12, its magnitude is regulated by the regulator 18, and the battery is recharged.

Figure 12:
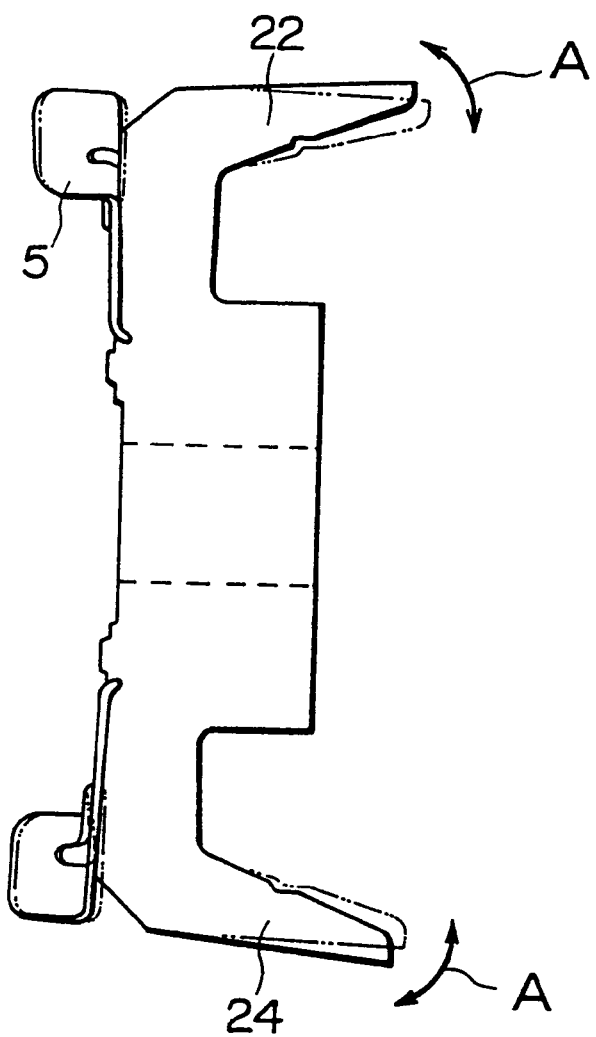
FIG. 12 is a front elevation of a pole core body from FIG. 9.

As the rotor 50 rotates, centrifugal force acts on the first claw-shaped magnetic poles 23 and the second claw-shaped magnetic poles 24 giving rise to vibrations in the direction of A in FIG. 12. At this time, because the first magnetic body 51 is secured to the first claw-shaped magnetic poles 23 and the second magnetic body 53 is secured to the second claw-shaped magnetic poles 24, the first magnetic body 51 and the second magnetic body 53 vibrate together with the first claw-shaped magnetic poles 23 and the second claw-shaped magnetic poles 24, respectively, and the first magnetic body 51 and the second magnetic body 53 cannot be damaged by collisions with the tips of the claw-shaped magnetic poles 23, 24.

Moreover, the above first magnetic body 51 and second magnetic body 53 are integrated at the roots and tips of the claw-shaped magnetic poles 23, 24, but they may be integrated by bridging intermediate portions of the claw-shaped magnetic poles 23, 24 with connecting parts, for example.

Embodiment 2

Figure 3:
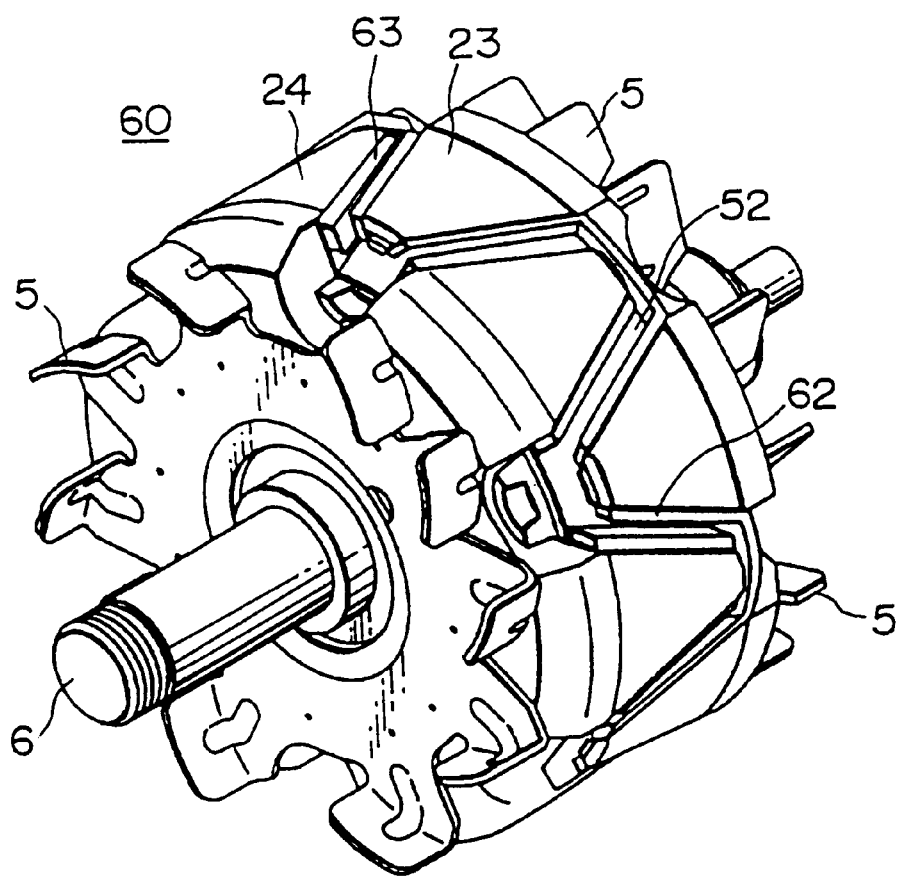
FIG. 3 is a perspective of a rotor of an automotive alternator according to Embodiment 2 of the present invention.
Figure 4:
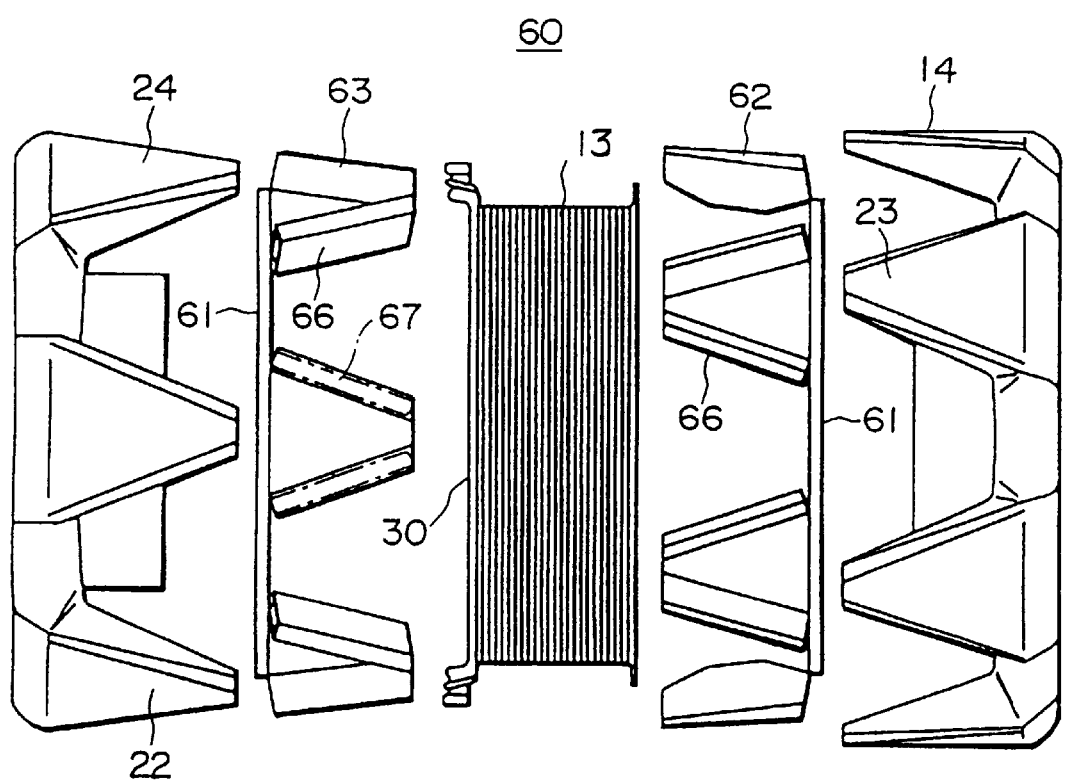
FIG. 4 is an exploded front elevation of the rotor in FIG. 3.
Figure 5:
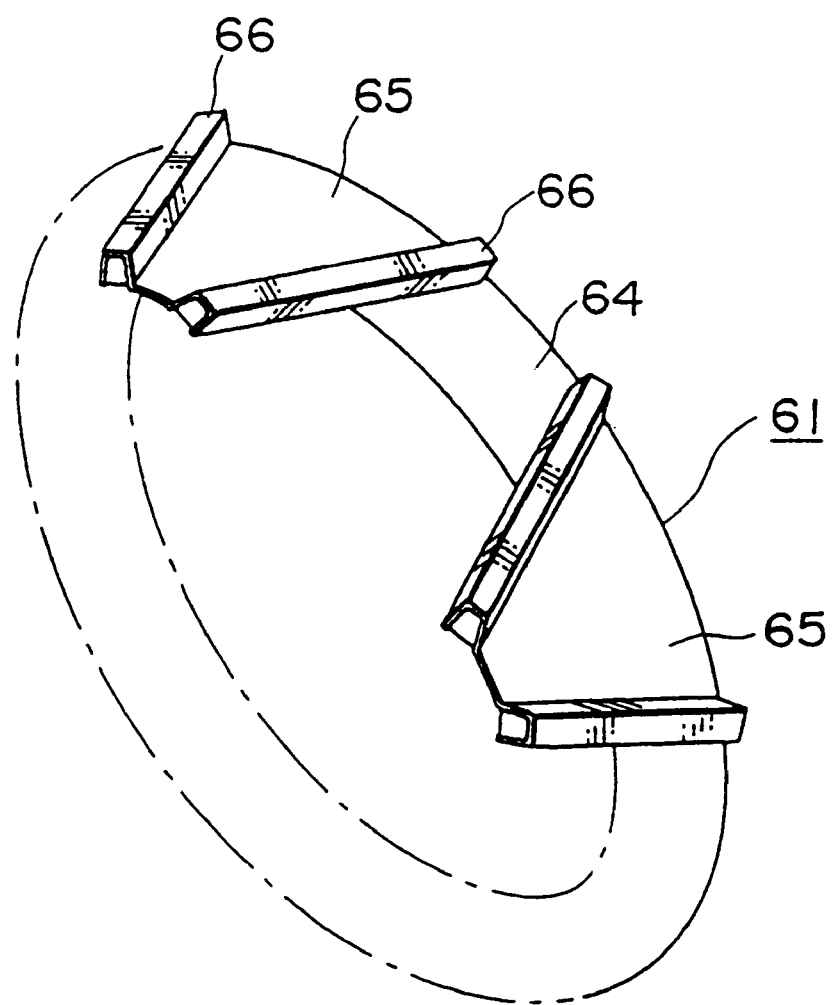
FIG. 5 is a perspective of a connecting member from FIG. 3.
Figure 6:
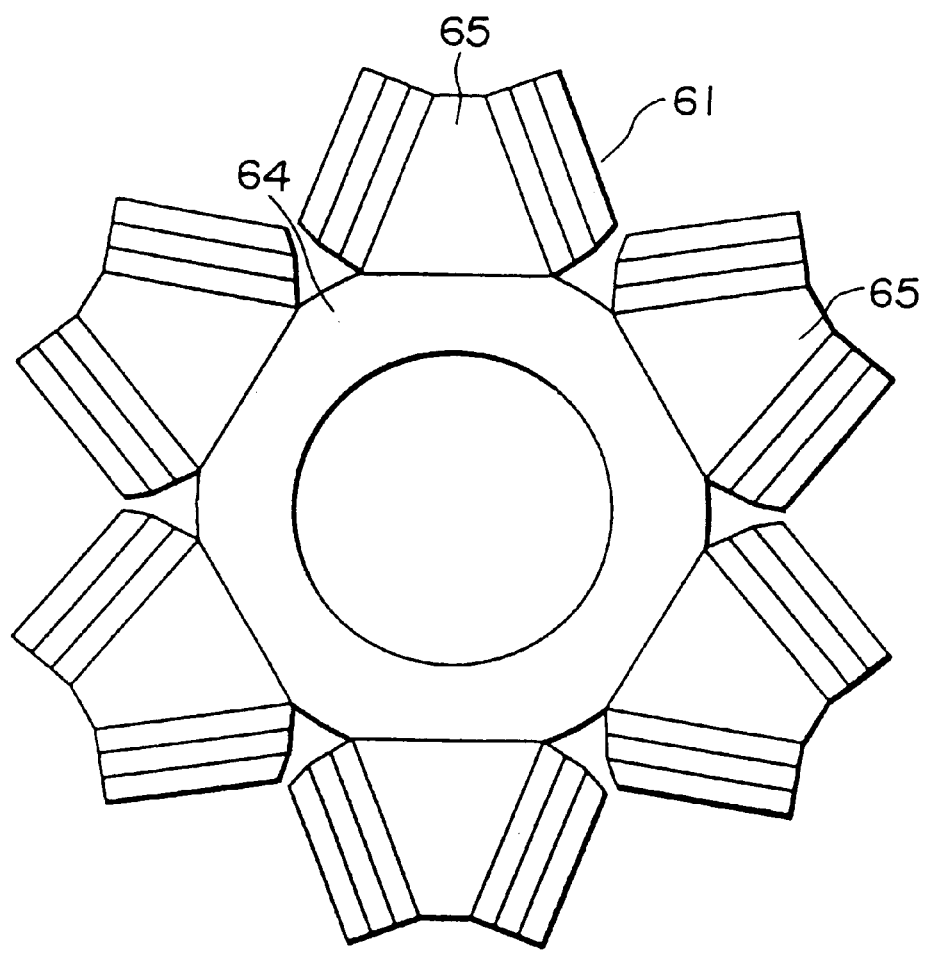
FIG. 6 is a developed projection of the connecting member in FIG. 5.

FIG. 3 is a perspective of a rotor 60 of an automotive alternator according to Embodiment 2 of the present invention, FIG. 4 is an exploded front elevation of the rotor 60 in FIG. 3, FIG. 5 is a perspective of a connecting member 61 from FIG. 3, and FIG. 6 is a developed projection of the connecting member 61 in FIG. 5.

In this embodiment, a first magnetic body 61 and a second magnetic body 63 each include a connecting member 61 and magnets 67. Each connecting member 61 includes an annular portion 64, trapezoid portions 65 positioned between the rotor coil 31 and the claw-shaped magnetic poles 23, 24 bent over from outer circumferential portions of the annular portion 64, and magnet housing portions 66 formed by bending both oblique edges of each of the trapezoid portions 65 into box-shaped cross-sections. In the magnet housing portions 66 of the first magnetic body 61, the north-seeking sides of the magnets 67 face the north-seeking first claw-shaped magnetic poles 23, and in the magnet housing portions 66 of the second magnetic body 63, the south-seeking sides of the magnets 67 face the south-seeking second claw-shaped magnetic poles 24.

The above connecting members 61 are simply formed by bending aluminum plate into the shape shown in FIG. 6 by a pressing process.

Embodiment 3

Figure 7:
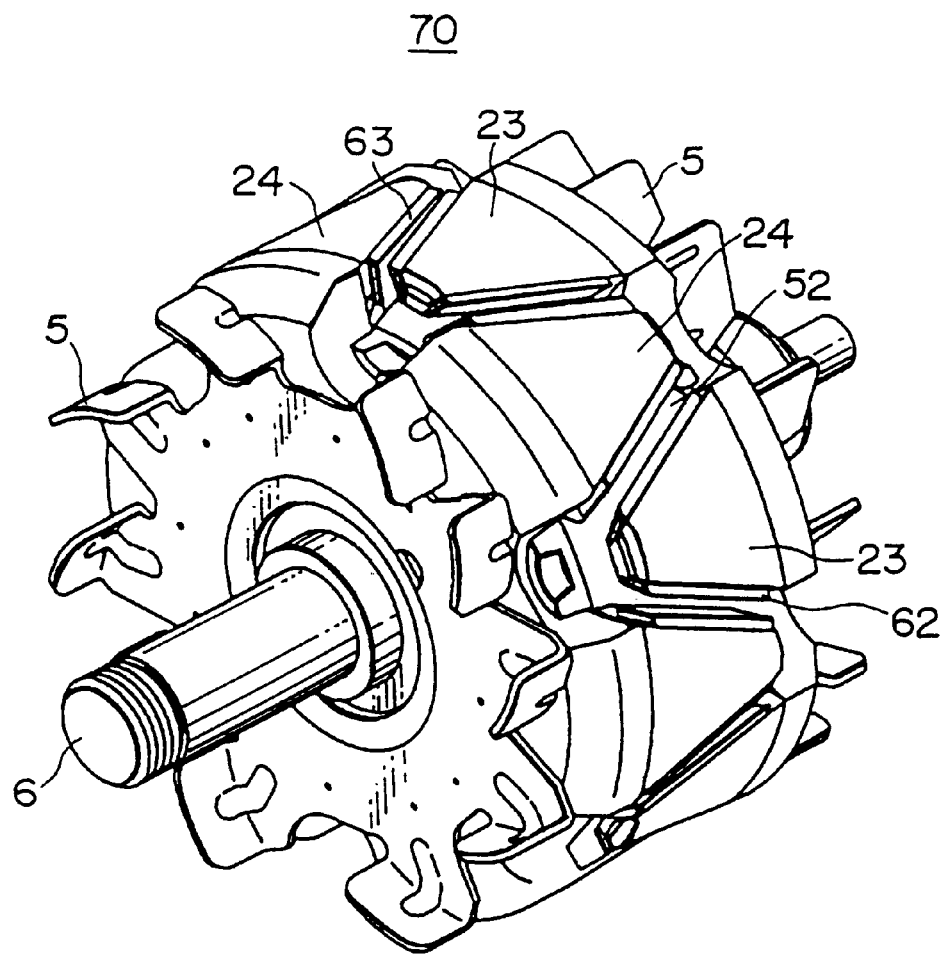
FIG. 7 is a perspective of a rotor of an automotive alternator according to Embodiment 3 of the present invention.
Figure 8:
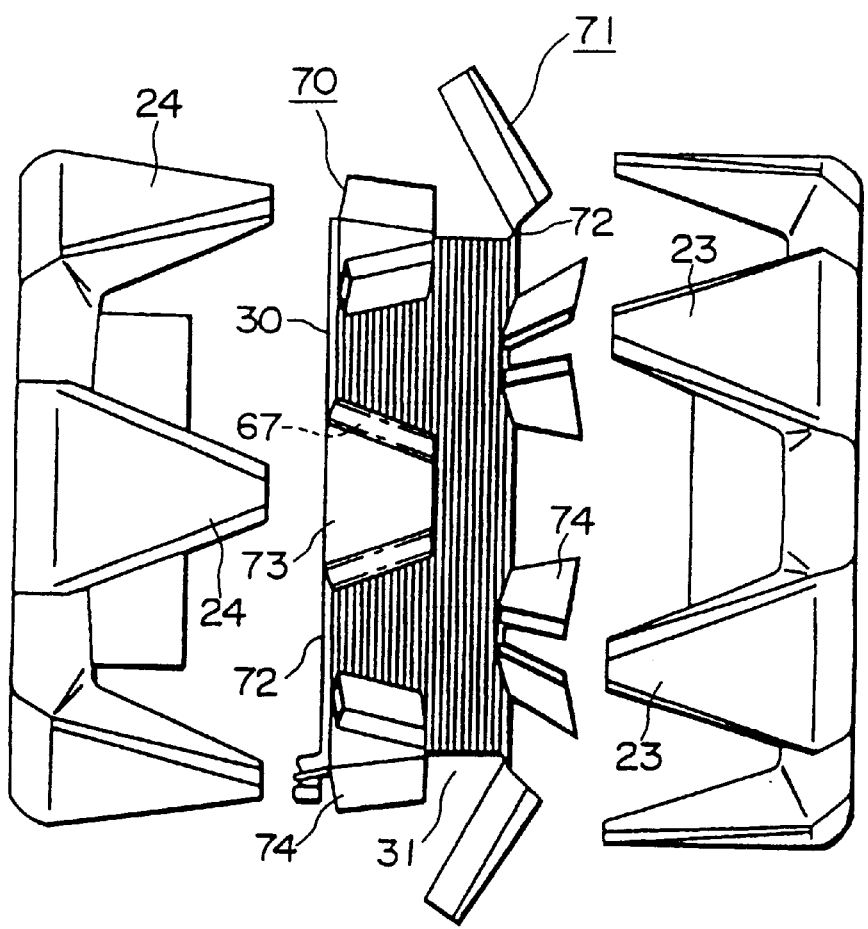
FIG. 8 is exploded front elevation of the rotor in FIG. 7.

FIG. 7 is a perspective of a rotor 70 of an automotive alternator according to Embodiment 3 of the present invention, FIG. 8 is exploded front elevation of the rotor 70 in FIG. 7.

In Embodiment 3, connecting portions 71 include trapezoid portions 73 positioned between the rotor coil 13 and the claw-shaped magnetic poles 23, 24 connected to flanges 72 of the bobbin 30, and magnet housing portions 74 for housing magnets 67 formed by bending both oblique edges of each of the trapezoid portions 73 into box-shaped cross-sections.

Moreover, each of the above embodiments is explained using a rotor of an automotive alternator as an example of a rotor of a dynamo-electric machine, but, of course, the present invention can also be applied to a rotor of an electric motor, for example.

As explained above, the rotor for a dynamo-electric machine according to one aspect of the present invention comprises: a rotor coil including wire wound onto a bobbin for generating magnetic flux by passing an electric current through said wire; a first pole core body disposed so as to cover said rotor coil formed with a plurality of first claw-shaped magnetic poles evenly spaced around a circumferential portion thereof being magnetized by the magnetic flux; a second pole core body disposed facing the first pole core body having second claw-shaped magnetic poles spaced so as to intermesh between the first claw-shaped magnetic poles; a first magnetic body secured to the first pole core body being magnetized in directions reducing magnetic flux leakage with the second claw-shaped magnetic poles at each side surface of the first claw-shaped magnetic poles; and a second magnetic body secured to the second pole core body facing the first magnetic body across an air gap being magnetized in directions reducing magnetic flux leakage with the first claw-shaped magnetic poles at each side surface of the second clawshaped magnetic poles. Therefore, the first magnetic body vibrates together with the first claw-shaped magnetic poles, and the second magnetic body vibrates together with the second claw-shaped magnetic poles, improving tolerance to high speed by eliminating the risk that the first magnetic body or the second magnetic body will be damaged by collisions with the tips of the claw-shaped magnetic poles.

According to one form of the rotor for a dynamo-electric machine, the first magnetic body and the second magnetic body may be shaped so as to wind in a zigzag circumferentially and compose of plastic magnets. Therefore, the first magnetic body and the second magnetic body can be simply prepared by injection molding.

According to another form of the rotor for a dynamo-electric machine, the first magnetic body and the second magnetic body each may comprise: a connecting member including an annular portion, trapezoid portions positioned between the rotor coil and the claw-shaped magnetic poles bent over from outer circumferential portions of the annular portion, and magnet housing portions formed by bending both oblique edges of each of the trapezoid portions into box-shaped cross-sections; and magnets housed in the magnet housing portions. Therefore, the first magnetic body and the second magnetic body can be simply prepared.

According to still another form of the rotor for a dynamo-electric machine, the connecting member may be formed from aluminum plate. Therefore, the connecting members can be simply prepared and the overall weight can be reduced.

According to another form of the rotor for a dynamo-electric machine, the first magnetic body and the second magnetic body each may comprise: connecting member including trapezoid portions positioned between the rotor coil and the claw-shaped magnetic poles connected to flanges of the bobbin, and magnet housing portions formed by bending both oblique edges of each of the trapezoid portions into box-shaped cross-sections; and magnets housed in the magnet housing portions. Therefore, it is possible to form the connecting members simultaneously from the same material as the bobbin when the bobbin is formed, simplifying the manufacturing process.

The method for magnetizing the first and second magnetic bodies of a rotor for a dynamo-electric machine according to another aspect of the present invention wherein a magnetically permeable member is inserted into the air gap between the first magnetic body and the second magnetic body when the first magnetic body and the second magnetic body are magnetized by passing a current through a magnetizing yoke. Therefore, the first magnetic body and the second magnetic body can be magnetized to a high flux density.

What is claimed is:

1. A rotor for a dynamo-electric machine comprising:

a rotor coil comprising wire wound onto a bobbin for generating magnetic flux by passing an electric current through said wire;

a first pole core body disposed so as to cover said rotor coil formed with a plurality of first claw-shaped magnetic poles evenly spaced around a circumferential portion thereof being magnetized by said magnetic flux;

a second pole core body disposed facing said first pole core body having second claw-shaped magnetic poles spaced so as to intermesh between said first claw-shaped magnetic poles;

a first magnetic body secured to only said first pole core body of said first and second pole core bodies, the first magnetic body being magnetized in directions reducing magnetic flux leakage with said second claw-shaped magnetic poles at each side surface of said first claw-shaped magnetic poles; and a second magnetic body secured to only said second pole core body of said first and second pole core bodies, wherein the first and second magnetic bodies are separated by an air gap and the second magnetic body is magnetized in directions reducing magnetic flux leakage with said first claw-shaped magnetic poles at each side surface of said second claw-shaped magnetic poles, wherein said air gap extends substantially along the entire length of the first and second claw-shaped magnetic poles of said first and second pole core bodies.

2. The rotor for a dynamo-electric machine according to claim 1, wherein said first magnetic body and said second magnetic body are shaped so as to circumferentially surround said rotor coil in a zigzag pattern and comprise plastic magnets.

3. The rotor for a dynamo-electric machine according to claim 1, wherein said first magnetic body and said second magnetic body each comprise:

a connecting member comprising an annular portion, trapezoid portions positioned between said rotor coil and said claw-shaped magnetic poles, wherein the trapezoid portions are bent over from outer circumferential portions of said annular portion, and magnet housing portions formed by bending both oblique edges of each of said trapezoid portions into box-shaped cross-sections; and magnets housed in said magnet housing portions.

4. The rotor for a dynamo-electric machine according to claim 3 wherein said connecting member is formed from aluminum plate.

5. The rotor for a dynamo-electric machine according to claim 1, wherein said first magnetic body and said second magnetic body each comprise:

connecting member comprising trapezoid portions positioned between said rotor coil and said claw-shaped magnetic poles connected to flanges of said bobbin, and magnet housing portions formed by bending both oblique edges of each of said trapezoid portions into box-shaped cross-sections; and magnets housed in said magnet housing portions.

6. A method for magnetizing magnetic bodies of a rotor for a dynamo-electric machine comprising a rotor coil, a first pole core body disposed so as to cover said rotor coil and having a plurality of first claw-shaped magnetic poles, a second pole core body disposed facing said first pole core body and having a plurality of second claw-shaped magnetic poles, a first magnetic body secured to only said first pole core body of said first and second pole core bodies, and a second magnetic body secured to only said second pole core body of said first and second pole core bodies, said first and second magnetic bodies being separated by an air gap, the second magnetic bosy being magnetized in directions reducing magnetic flux leakage with said first claw-shaped magnetic poles at each side surface of said second claw-shaped magnetic poles, the method comprising magnetizing the first magnetic body and the second magnetic body by inserting a magnetically permeable member into said air gap between said first magnetic body and said second magnetic body when said first magnetic body and said second magnetic body are magnetized by passing a current through a magnetizing yoke, wherein said air gap extends substantially along the entire length of the first and second claw-shapes magnetic poles of said first and second pole core bodies.

* * * * *